(12) United States Patent
Haidar

(10) Patent No.: US 10,909,330 B2
(45) Date of Patent: Feb. 2, 2021

(54) COMPUTER SYSTEM CONFIGURED FOR ISSUING A PERSONALIZED VEHICLE NUMBER PLATE

(71) Applicant: Plate Properties Pty Ltd, St. Lenonards (AU)

(72) Inventor: Ali Haidar, St. Lenonards (AU)

(73) Assignee: Plate Properties Pty' Ltd, St. Lenonards (AU)

( * ) Notice: Subject to any disclaimer, the term of this patent is extended or adjusted under 35 U.S.C. 154(b) by 6 days.

(21) Appl. No.: 15/793,487

(22) Filed: Oct. 25, 2017

(65) Prior Publication Data
US 2018/0239757 A1    Aug. 23, 2018

(30) Foreign Application Priority Data
Feb. 23, 2017   (AU) ................ 2017900598

(51) Int. Cl.
| | |
|---|---|
| G06F 40/56 | (2020.01) |
| G06Q 50/30 | (2012.01) |
| G06Q 50/26 | (2012.01) |
| G06Q 10/10 | (2012.01) |
| B60R 13/10 | (2006.01) |
| G06F 16/9535 | (2019.01) |
| G06Q 30/06 | (2012.01) |

(52) U.S. Cl.
CPC ............ *G06F 40/56* (2020.01); *B60R 13/105* (2013.01); *G06F 16/9535* (2019.01); *G06Q 10/10* (2013.01); *G06Q 30/0601* (2013.01); *G06Q 30/0621* (2013.01); *G06Q 50/26* (2013.01); *G06Q 50/30* (2013.01)

(58) Field of Classification Search
CPC ............ G06F 17/2881; G06F 16/9535; G06F 17/30867; B60R 13/105; G06Q 10/10; G06Q 50/26; G06Q 50/30; G06Q 99/00
USPC ............................................ 704/9
See application file for complete search history.

(56) References Cited

U.S. PATENT DOCUMENTS

6,963,871 B1 * 11/2005 Hermansen ............ G06F 16/33
9,087,187 B1 *  7/2015 Doane ................. H04L 9/321
(Continued)

FOREIGN PATENT DOCUMENTS

WO    WO 01/22317    3/2001

OTHER PUBLICATIONS

European Search Report from corresponding foreign Application No. EP 17 19 5529 dated Feb. 12, 2018.
(Continued)

*Primary Examiner* — Richemond Dorvil
*Assistant Examiner* — Rodrigo A Chavez
(74) *Attorney, Agent, or Firm* — Neal, Gerber & Eisenberg LLP

(57) ABSTRACT

The present disclosure relates to a computer-implemented method configured to generate a personalized vehicle number plate based on a keyword. The method electronically generates a combined set of character strings appropriate for selection by the user for a personalized vehicle number plate by combining a: a plurality of character strings or content derived from or based on user details; and/or a second plurality of character strings or content derived from or based on one or more keywords.

18 Claims, 10 Drawing Sheets
(10 of 10 Drawing Sheet(s) Filed in Color)

(56) References Cited

U.S. PATENT DOCUMENTS

| | | | |
|---|---|---|---|
| 2013/0076531 A1* | 3/2013 | San Vicente | H04W 52/0219 340/870.02 |
| 2013/0216102 A1* | 8/2013 | Ryan | G06F 16/25 382/105 |
| 2014/0250021 A1* | 9/2014 | Francis | G06F 16/93 705/317 |
| 2015/0106663 A1* | 4/2015 | Richter | G06F 11/3476 714/45 |
| 2015/0339661 A1* | 11/2015 | Li | G06Q 20/40 705/41 |
| 2017/0083499 A1* | 3/2017 | VanBlon | G06F 3/04886 |

OTHER PUBLICATIONS

"Trie" Wikipedia, dated Feb. 3, 2017, XP055450111, retrieved from the Internet: URL:https://en.wikipedia.org/w/index.php?title=Trie&oldid=763559320 [retrieved on Feb. 12, 2018].

* cited by examiner

FIGURE 8C

COMPUTER SYSTEM CONFIGURED FOR ISSUING A PERSONALIZED VEHICLE NUMBER PLATE

PRIORITY CLAIM

This application claims the benefit of and priority to Australian Patent Application No. 2017900598, filed on Feb. 23, 2017, the entire contents of which is incorporated by reference herein.

TECHNICAL FIELD

The present disclosure relates broadly to a computer system and computer-implemented method configured to issue a personalized vehicle number plate.

BACKGROUND

Personalized vehicle number plates were introduced across the various States and Territories of Australia from circa the 1980s. In addition to the style of plate selected, it was possible to request preferred content for the plate reflecting the user's name, pseudonym, or other personal preferences. Currently the Government agency in the relevant State or Territory control the issuance of personalized number plates, typically via a contracted third party provider. The provider enables users via the web to enter letters/numbers of their preferred personalized plate and, assuming their preferred personalized plate is available, the user is able to purchase the plate online. This system is cumbersome for the user who due to the large population of taken personalized plates frequently has their preferred entry rejected in which case they may be required to repeatedly adjust their selection. More often, the user through frustration from not obtaining their preferred choice exits the system without purchasing a personalized plate. If the user after repeated entries is lucky enough to select an available plate they may find that it has a low degree of personalization and as a result the user may be dissatisfied with their final purchase.

SUMMARY

According to a first aspect of the present disclosure there is provided a computer system configured to issue a personalized vehicle number plate, the computer system comprising:

a receiving module configured to electronically receive content associated with an individual;

a first generation module associated with the receiving module and configured to electronically generate a first plurality of character strings of a predetermined number of characters, the generation of the first character strings derived from the application of a rules-based algorithm to the received content;

a second generation module associated with the receiving module and configured to electronically generate a second plurality of character strings of a range of predetermined numbers of characters, the generation of the second character strings derived from the application of a hybrid-type algorithm to the received content;

a comparison module configured to electronically compare the first and second generated character strings with unavailable character strings;

a presentation module associated with the comparison module and configured to electronically present available character strings based on the comparison of the first and second generated character strings with the unavailable character strings;

an issuing module configured to electronically receive a selection of one of the presented of the available character strings for issuance to the individual as a personalized vehicle number plate.

In certain embodiments, the system also comprises a storage module associated with the comparison module and configured to periodically store the unavailable character strings locally in a digital trie data structure for comparison with the generated character strings. In certain embodiments, the system further comprises a remote database associated with the storage module and including a substantially real-time record of the unavailable character strings for periodically importing to the storage module for storage. In certain such embodiments, the system additionally comprises a confirmation module configured to electronically compare the selected one of the presented of the available character strings with the unavailable character strings from the remote database to confirm availability of the selected one of the available character strings.

In certain embodiments, the first generation module includes a first generation engine configured to electronically implement the rules-based algorithm including the steps of:
  i) interposing one or more characters between at least one of the received content; or
  ii) prefixing or suffixing one or more characters to at least one of the received content,
to produce the first plurality of character strings of the predetermined number of characters.

In certain embodiments, the second generation module includes a second character generation engine configured to electronically implement the hybrid-type algorithm including the steps of:
  i) replicating at least one of the characters of the received content to produce a first generation set of character strings;
  ii) for each member of the first generation set, replicating at least one of the characters to produce a second generation set of character strings;
  iii) repeating step ii) for each member of the second generation set until a predetermined maximum number of characters is obtained in the generated set of character strings.

In certain embodiments, the second generation module is configured to combine the first and subsequent sets of the character strings to provide the second plurality of character strings of the range of predetermined numbers of characters.

According to a second aspect of the disclosure there is provided a computer-implemented method of issuing a personalized vehicle number plate, said method comprising the steps of:

electronically receiving content associated with an individual;

electronically generating a first plurality of character strings of a predetermined number of characters, the generation of the character strings derived from the application of a rules-based algorithm to the received content;

electronically generating a second plurality of character strings of a range of predetermined numbers of characters, the generation of the second character strings derived from the application of a hybrid-type algorithm to the received content;

electronically comparing the first and second generated character strings with unavailable character strings;

electronically presenting available character strings based on the comparison of the first and second generated character strings with the unavailable character strings;

electronically receiving a selection of one of the presented of the available character strings for issuance to the individual as a personalized vehicle number plate.

In certain embodiments, the method also comprises the step of periodically storing the unavailable character strings locally in a digital trie data structure for comparison with the generated character strings. In certain such embodiments, the method further comprises the step of periodically importing the unavailable character strings from a remote database including a substantially real-time record of the unavailable character strings. In certain other embodiments, the method additionally comprises the step of comparing the selected one of the presented of the available character strings with the unavailable character strings from the remote database to confirm availability of the selected character strings.

In certain embodiments, the step of electronically generating the first plurality of character strings involves:
  i) interposing one or more characters between the received content; or
  ii) prefixing or suffixing one or more characters to the received content, to produce the first plurality of character strings of the predetermined number of characters.

In certain embodiments, the step of electronically generating the second plurality of character strings involves:
  i) replicating at least one of the characters of the received content to produce a first generation set of character strings;
  ii) for each member of the first generation set, replicating at least one of the characters to produce a second generation set of character strings;
  iii) repeating step ii) for each member of the second generation set until a predetermined maximum number of characters is obtained in the generated set of character strings.

In certain embodiments, this step also involves combining the first and subsequent sets of the character strings to provide the second plurality of character strings of the range of predetermined numbers of characters.

In certain embodiments, the method also comprises the step of combining the first and second generated character strings to provide a combined set of generated character strings prior to comparison with the unavailable character strings. In certain such embodiments, the method also comprises the step of partitioning the combined set of character strings prior to presenting the available character strings, said partitioning involving separating of the combined set of character strings into subsets of character strings of respective of the range of predetermined numbers of characters.

Additional features and advantages are described in, and will be apparent from the following Detailed Description and the figures.

BRIEF DESCRIPTION OF DRAWINGS

The patent or application file contains at least one drawing executed in color. Copies of this patent or patent application publication with color drawing(s) will be provided by the Office upon request and payment of the necessary fee.

In order to achieve a better understanding of the nature of the present disclosure certain embodiments of a computer system and computer-implemented method configured to issue a personalized vehicle number plate will now be described, by way of example only, with reference to the accompanying drawings in which:

FIGS. 8A to 8C show exemplary screen shots relevant to the preceding embodiment of the computer system and computer-implemented method configured to issue a personalized vehicle number plate.

DETAILED DESCRIPTION

Referring now to the example embodiments of the present disclosure illustrated in FIGS. 1 to 8C, FIG. 1 illustrates one embodiment of a computer-implemented method configured to issue a personalized vehicle number plate based in this example on a single keyword in the form of a first name REEM of an individual. It will be understood that the method also extends to other content including alphabetical characters, keywords, numbers and/or combinations thereof and the first name REEM is selected for illustrative purposes only. The method of this embodiment electronically generates a combined set of character strings appropriate for selection as a personalized vehicle number plate by combining:

1. a first plurality of character strings or content derived from or based on user details, such as their first name REEM;
2. a second plurality of character strings or content derived from or based on one or more keywords, such as the first name REEM.

In this embodiment, the first plurality of character strings are electronically generated by application of a rules-based algorithm to the first name REEM. The second plurality of character strings are electronically generated by application of a hybrid-type algorithm to the keyword REEM. The rules-based and hybrid-type algorithms are in this example combined in the form of a combined algorithm.

The generated character strings or content in the form of possibilities for personalized vehicle number plates are electronically checked for availability. In this embodiment, this availability check is performed by comparing the generated character strings with unavailable character strings, such as vehicle number plates already taken.

Figure 2:
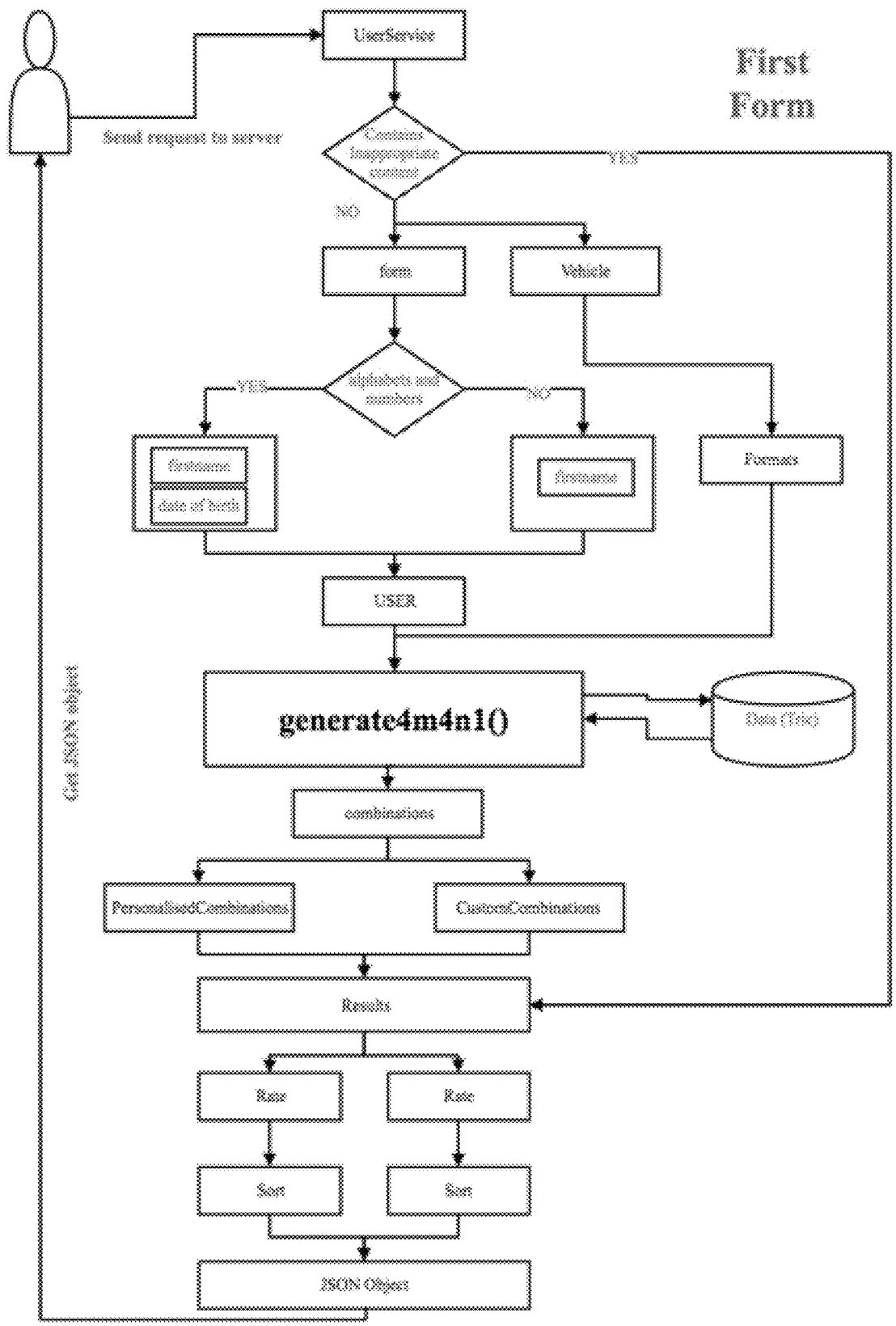
FIG. 2 is a logic flow diagram of one implementation for electronically generating character strings in the computer-implemented method of FIG. 1.
Figure 3:
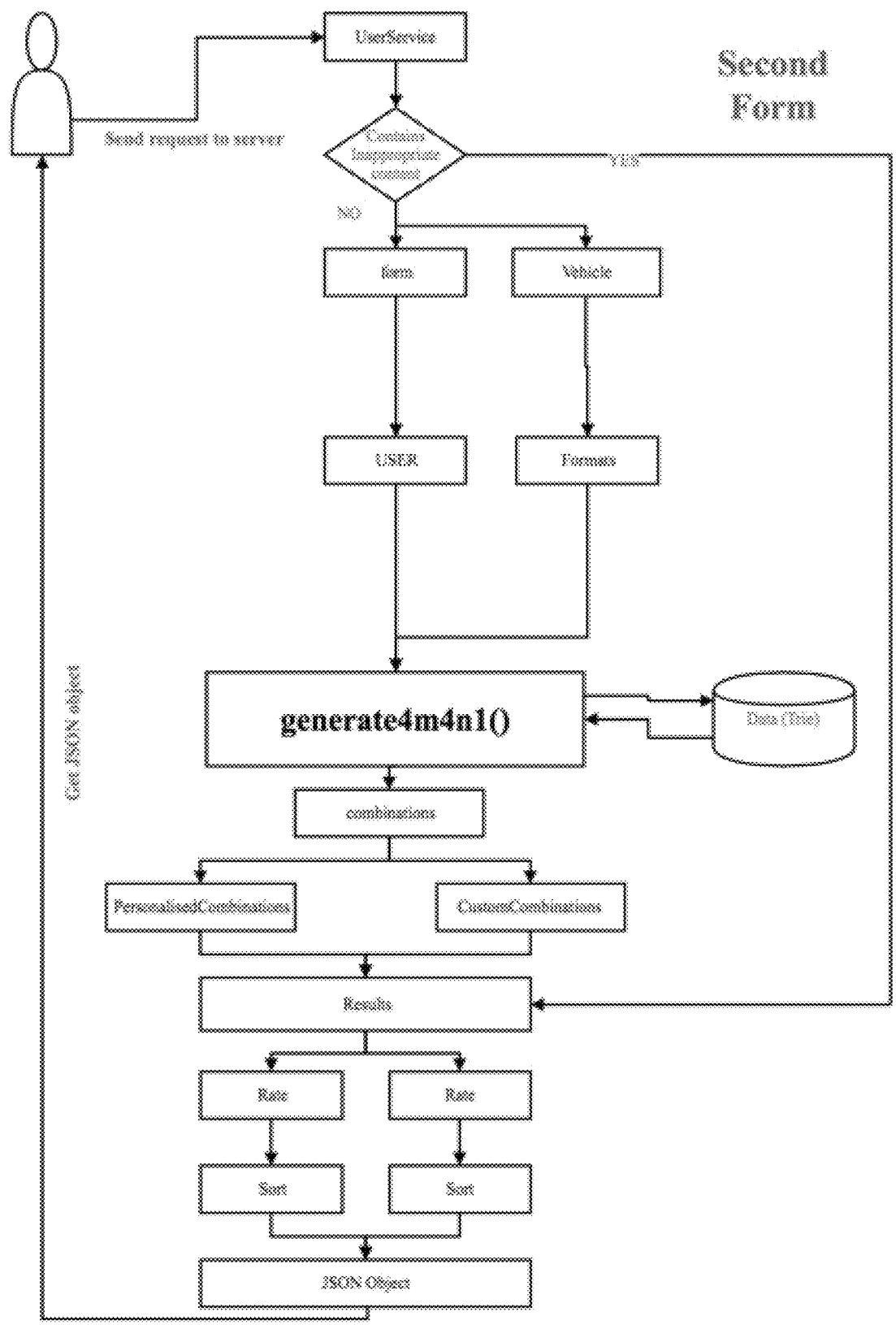
FIG. 3 is a logic flow diagram of another implementation for electronically generating character strings in the computer-implemented method of FIG. 1.

FIG. 2 illustrates a logic flow diagram where a user or individual enters a keyword or desired number plate in a "first form". The system electronically generates character strings using a combined algorithm designated "generate4M4N1( )". The generated character strings are electronically compared with unavailable character strings maintained in local memory or a storage module in a digital trie data structure. The P and P+ generated character strings or vehicle number plates which are available are partitioned and the results rated and sorted. In this embodiment, the available character strings or vehicle number plates are rated from the most personalized down to the least personalized and accordingly sorted in that order or level of personalization. The available generated character strings or vehicle number plates are then presented or in this example electronically displayed for selection. The display offers both the P and P+ number plates partitioned and ordered in their level of personalization FIG. 3 illustrates a logic flow diagram where a user or individual accesses the computer system entering data in a "second form" including fields relevant to the individual user such as first name or nickname, middle initial, last name or company, data of birth, favourite number, and vehicle make or model. In this variation on implementation of the disclosure, the generation, comparison, and presentation of character strings or available number plates is otherwise substantially identical to the implementation of the preceding paragraph. In particular, both implementations rely upon the "4M4N1" algorithm of the embodiment wherein:

```
1:  User ←get user details
2:  if User ≠ empty then
3:      F I D ← GENERATEFID(User);     dates
    =GENERATENUMERICS(User)
4:      S I D ← GENERATESID(User)
5:  else
6:      F I D ← GENERATERANDOMFID( );  dates
    =GENERATENUMERICSRandomly( )
7:      S I D ←empty
8:  for part in FID do{
9:      combinations+ = COMBINER1(part, F I D.dates)}
10: for part in SID do{
11:     combinations+ = COMBINER2(part)}
12:     combinations                                ←
    REMOVETAKENANDLOOKALIKECOMBINATIONS
    (combinations)
13:     combinations ← RATE(combinations)
14:     combinations ← VIEW(combinations)
Where FID stands for "first important data" and SID stands for
"second important data".
```

Important Data (ID) is a set of combined phrases that are generated for every user, and considered related to user details. Identifying the important data enables the preferred algorithm to have details that are related to the client and can be embedded in the company or Government agency formats. Two methods or algorithms to set the important data are in this embodiment implemented. In the first method, FID that contains alphabetical important data is generated in addition to dates that consists of numerical important data. In the second method, SID including alphabetical strings is generated. The first method FID includes a rules-based algorithm derived from multiple surveys applied on both users and data sets, while the second method SID is derived from a hybrid-type algorithm that runs on specific parts of the user details. The preferred algorithm is a combination of the rules-based and hybrid-type algorithms.

In this embodiment, the computer-implemented methodology enables for personalized vehicle number plates of two categories, namely:

1. personalized "P" number plates of various alphanumeric formats typically prescribed by the relevant Government agency;

2. customised or "P+" number plates of a free format typically limited in its character length only, for example a minimum of four and maximum of six characters.

The presented or displayed available vehicle number plates are electronically selected by the user depending on their personal preference. In this embodiment, the selected one of the available character strings or personalized vehicle number plates is confirmed for availability prior to its issuance. This confirmation is effected by comparison of the selected vehicle number plate with a substantially real-time record of unavailable number plates maintained in a remote database typically managed by the relevant Government agency.

It should be appreciated that the applicant conducted surveys and studies to determine rules from which the rules-based algorithm configured to electronically generate character strings was derived. For example, the surveys enables the applicant to construct the rules-based algorithm based on various rules. In regard to alphabetical and numerical characters, the following exemplary rules were formulated.

Alphabets:

If the user has a first name that is equal or less than maximum size of letters of formats, add the first name to FID. Ex: (ALI is added, REEM is added, CARYN is not added).

If the user has a last name that is equal or less than maximum size of letters, add the last name to FID.

If the user has a nick name that is equal or less than maximum size of letters in formats, add the nick name to FID.

If the user has a first name and a last name, then if the grouping first letter of the first name and first letter of the last name is equal or less than maximum size of letters, add the grouping to FID.

If the user has a first name and a last name, then if the grouping 2*(first letter of the first name and first letter of the last name) is equal or less than maximum size of letters in formats, add the grouping to FID.

If the user has a first name that is less than maximum size of letters in p formats, then add the combination first name plus first letter of the last name to FID.

If the user has a first name, middle name, and last name. Add the combination first letter of the first name, first letter of the middle name, first letter of the last name to FID.

If the user has a first name, middle name, and last name. Add the combination first letter of the first name, first letter of the middle name, first letter of the last name, first letter of the first name to FID.

If the user has a last name and a first name, if the last name is less than the size of the maximum number of letters, add the grouping last name plus first letter of the first name to FID.

If the user has a nick name that is less than maximum size of letters and has a first name, then add the combination nick name plus first letter of the last name to FID.

If the user has a nick name that is equal to the max number of letters, and has two chars similar at the end, remove one of the chars and add it to FID.

If the user added first name and last name in addition to partner initials, add first letter of the first name plus first letter of the last name plus partner initials to FID.

Numbers:

If the user entered his day of birth, add day of birth, zero plus day of birth, two zeros' plus day of birth, three zeros' plus date of birth, and it will continue adding zeros' until reaching maximum length of numbers inside formats. Every result of those will be added to dates.

If the user added a month of birth, same way will be followed as day of birth.

If the user has month and day, it will add day and month, zero plus day plus month, zero plus day plus zero plus month, two zero's, plus day plus month, day plus zero plus month, month plus day. Every grouping formed will be added to dates.

If the user added his year of birth, then his year of birth, a two last digits of his year of birth, zero combined to the last digits in year of birth, and two zero's combined to last digit in his year of birth will be added to the dates.

If the user has month and year of birth, his month combined to last two digits in his year of birth will be added to the dates.

If the user has month and year of birth, try to add zero plus month of birth plus last two digits in the year of birth to dates.

If the user has day, month and year of birth, add day of birth plus month of birth plus last two digits of year of birth to dates.

If user added favorite, add it to dates. Also, if it is less than the maximum length of digits inside p formats, the algorithm will keep adding zero's until reaching the maximum length, then add every result to dates.

Although generating important data from alphabets and numbers provides a relatively strong base to be used in producing combinations, attention is to be paid to how and where to embed this important data. In some case, the phrase "personalization" fades when partitioning these parts, and adding numbers between them. In this system, the applicant sought in the preferred rules-based algorithm not only to have parts of user details in the generated content, but also to find combinations that are meaningful and can be understood. For this reason, each alphabetical part created has a characteristic, which determines the way it can be partitioned across the various number plate formats.

Figure 1:
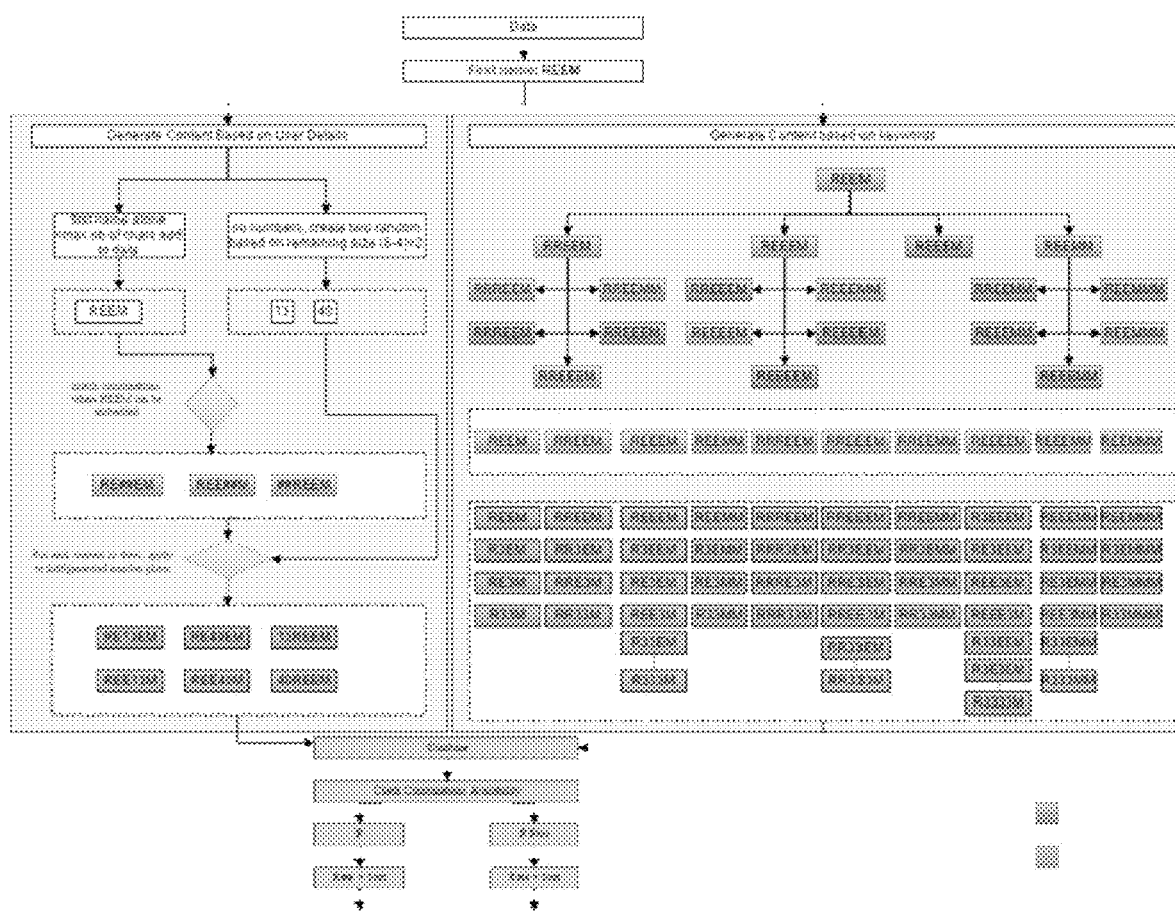
FIG. 1 is a schematic block diagram of a computer-implemented method configured to issue a personalized vehicle number plate according to one embodiment of the disclosure.

FIG. 1 on the left hand side shows electronic generation of a first plurality of character strings based on FID where the user has entered their details, such as their first name "REEM in either the "First Form" or the "Second Form". The rules-based algorithm manipulates the first name REEM to produce a first plurality of character strings of the predetermined number of characters, in this example six characters. This is effected by either:

1. interposing one or more characters, in this example numerals, between characters of REEM;
2. prefixing or suffixing one or more characters, in this example numerals, to REEM.

In this example the numbers may be generated randomly, in the event that the user details entered do not include numbers, or extracted from numbers included in the user details, for example the user's date of birth. The rectangle shown in hidden detail in the bottom left hand corner of FIG. 1 illustrates the first plurality of generated character strings or number plates created from this rules-based algorithm.

FIG. 1 on the right hand side shows electronic generation of a second plurality of character strings based on SID derived from keywords, such as the first name REEM. In this case the system uses a hybrid-type algorithm to electronically generate character strings or personalized number plates derived from entered keyword(s) wherein:

i) an initial population or generation is created from a single entry in the form of the keyword;
ii) a next generation is created from the initial generation by replicating or in this case duplicating each character or letter for each member of the initial generation;
iii) repeating this process for every generation until the maximum number of available formats or available character lengths is reached.

In the embodiment illustrated, the initial population or generation has four members shown in the tree-type structure under REEM. This first generation is created by duplicating each character in REEM working from left to right. In the first generation this creates two records of REEEM which requires deletion of the duplicate record. The next generation is created by, for each member of the preceding generation, duplicating each character from that member moving from left to right. The next generation is then filtered by removing any duplicate records, such as RRREEM and RREEEM derived from RREEM being the relevant member of the initial generation. This process is repeated until the maximum number of available formats, in this case a maximum of six characters in length, is achieved. In this example the hybrid-type algorithm produces ten possible character strings or personalized number plates in the second plurality of character strings, see the elongate rectangle shown in the middle right hand side of FIG. 1.

In this embodiment, the second plurality of character strings may be increased by substituting numerals for letters, particularly where the numeral visually resembles the letter such as 3 substituting for E. The large rectangle shown in hidden detail in the bottom right hand side of FIG. 1 illustrates this technique where each of the ten possible second character strings are expanded by substituting numeral 3 for each of the E's to provide additional permutations.

In certain embodiments, the system and computer implemented methodology are implemented as a rest web service. The system operates with two types of inputs, namely user form, or single phrase such as a keyword. In the user form, the user enters multiple input parameters and then sends a request to the server. In the single phrase the user adds one single phrase that can be composed from both alphabetical and numerical components. Content generation is typically applied by the same set of code or preferred combined algorithm.

/check: generates number plates based on a full form that contains different parameters.

/checkone: generates number plates based on a form that contains only one parameter.

Both implementations of the example use the vehicle type as an important parameter to generate content. Vehicle type if not entered or sent with the request defaults to 'car'. The generated content differs based on vehicle-selected type. Cars in this example have ten formats in the P category. Motorcycles have three formats in the P category, all of them have a length of five. Trailers have three formats in the P category, all of them hold the size of six. Heavy vehicles have three formats in the P category.

/check

This method shown in FIG. 2 in the rest web service of this embodiment takes a request from a form. This method takes twelve parameters in the request. This form consists of two types of information: user information and vehicle type. The user information is taken to generate number plates while the vehicle types are read to select the available formats to be generated. The user information includes: first name, middle name, last name, nick name, day, month, year, favourite number, previous combination and partner name. Some of these parameters may be hidden until a decision is taken to make them available for use.

Step 1:
The content is checked, null values are replaced with empty strings, spaces are removed from each parameter, Step 2:
A regular expression is used to test each content. If there is an offensive content in any of the parameters, a set of empty combinations is generated for p and p plus content, then sent back to user. A report instance is created to save the incident before getting back to user. Otherwise, the algorithm continues to next step.

Step 3:
A user instance is created to save all the elements given by the user while running the algorithm.

Step 4:
Vehicle type is checked. If vehicle type is null or empty, vehicle type will be assigned to value 'car'.

Step 5:
Check the vehicle type. Based on its type, add the content to support p formats. At this stage the algorithm is not generated p content of car as p plus content of trailers and vehicles.

Step 6:
Add the formats that would work with the whole vehicle type: car, motorcycle, trailers and heavy vehicles.

Step 7:
If the vehicle type is not motorcycle, add various formats that have size 6.

Step 8:
Create the set that will hold all the combinations.

Step 9:
Run the algorithm that generates personalized number plates and saves them in combinations.

Step 10:
Create two hash sets, one for p and the other for p plus.

Step 11:
Check in combinations, if it is not null add the content into p and p plus sets respectively. Based on front end request, add spaces for p number plates instead of. Finally, clear the memory created in step 7.

Step 12:
The results are sent to front end as a JSON object that consists of two elements. P and plus arrays. Add the two sets generated to an instance of class Result. This class will rate the elements and sort them. A JSON object will be then created ready to be sent to front end.

Step 13:
Report and send back. If the JSON object could not be generated, an error report will be generated and saved on the server.

/checkone
This method is shown in FIG. 3 and relies upon a single parameter, such as a keyword, entered by the user.

Step 1:
Save the form parameter to a variable.

Step 2:
Remove all the spaces from the variable.

Step 3:
A regular expression is used to test the content. If there is an offensive part in the content, a set of empty combinations is generated for p and p plus content, then sent back to user. A report instance is created to save the incident before getting back to user. Otherwise, the algorithm continues to next step.

Step 4:
Check if the content type. If the content type contains only alphabetical variables, create a new user having the name as the form parameter. Otherwise, divide the letters and numbers; use the letters as the first name of the new user and the numbers as the day of birth of the user.

Step 5:
Vehicle type is checked. If vehicle type is null or empty, vehicle type will be assigned to value 'car'.

Step 6:
Check the vehicle type. Based on its type, add the content to support p formats. At this stage the algorithm is not generated p content of car as p plus content of trailers and vehicles.

Step 7:
Add the formats that would work with the whole vehicle type: car, motorcycle, trailers and heavy vehicles.

Step 8:
If the vehicle type is not motorcycle, add various formats that have size 6.

Step 9:
Create the set that will hold all the combinations.

Step 10:
Create the set that will hold all the combinations.

Step 11:
Run the algorithm that generates personalized number plates and saves them in combinations.

Step 12:
Create two hash sets, one for p and the other for p plus.

Step 13:
Check in combinations, if it is not null add the content into p and p plus sets respectively. Based on front end request, add spaces for p number plates instead of.

Step 14:
Check the user-entered content. If the user-entered content is available, remove all the spaces in it and set its class to highlight so that its font and colour will be reversed on the front-end side. If the user-entered content is available and it is p plus content, replace where multiple spaces are found with one space and add it with a class highlight so that it can be reversed at the front end.

Step 15:
The results are sent to front end as a JSON object that consists of two elements. P and plus arrays. Add the two sets generated to an instance of class Result. This class will rate the elements and sort them. A JSON object will be then created ready to be sent to front end.

Step 16:
Report and send back. If the JSON object could not be generated, an error report will be generated and saved on the server In this example the generated character strings using the FID and SID implementations are combined using two combiners, namely:

Combiner 1: used to generate combinations from the FID of the rules-based algorithm;

Combiner 2: used to generate combinations from the SID of the hybrid-type algorithm.

Combiner 1 traverses the character strings generated and for each character attempts to distribute it depending on various rules applicable to number plates of different formats. It is expected that there may be 4 different scenarios or cases to which these FID rules are to apply:

Case 1: not a mix of two initials and same length as letters sum of the company format, leads to the creation of a template that contains this part. Example (JOH is a part of the alphabetical FID, AAA.999 is rule in the company. JOH has same length and it is not a mix of more than one initial so it can be distributed over the characters of the rule AAA.999. As a result, a template JOH.999 is found)

Case 2: same length as the company rule, with a characteristic mixed parts. It checks where the format is divided. If it is the same as the part, distribute. Example (ALIH is a mixed initial. Rule AAA.99A ALIH is mixed at 3 and AAA.99A is divided at 3 then distribute. By this, a template is created ALI.99H ready for numerical important data in FID).

Case 3: same length as the company format, with a characteristic mixed part. It checks where the rule is divide. It is not the same as the part, discard do not distribute. Example (ALIH is a mixed initial Rule AA.99.AA is partitioned at 2 while ALIH is mixed at 3 characters. As a result, discard and do not form a template).

Case 4: different length to the company rule, discard and jump to the next rule. Example (DH initial population and rule AAA.999)

Combiner 2 reflects survey results conducted by the applicant where although people prefer having letters more than numbers, they are nonetheless satisfied with combinations that are meaningful. In this example, a phrase that is only words is considered as a P+ combination. P plates contain both numbers and letters and it is possible to obtain meaningful combinations using numbers and letters. Some numbers can have the same meaning as letters where "A" may be replaced with the number "4", "I" with "1", alphabet "O" with "0" etc. Combiner 2 changes letters to numbers in specific places in an attempt to match prescribed formats. For each character of the SID population, combiner 2 traverses the various combination rules. This includes checking if the character or character combination has the same length as the format, attempting to change the alphabetical to numbers at the same place where numbers are found on the rule (prescribed format), if alphabetical characters can be flipped into numbers, it changes them and generates a combination otherwise it discards them. It is expected that there may be 3 different scenarios or cases to which these SID rules are to apply:

Case 1: part has same length of the rule, and letters can be changed to numbers. (Example: YASSER and rule AA.99.AA). SS can be altered with 55 then YA55ER is generated).

Case 2: part has same length of the rule, and letters cannot be replaced by numbers. (Example: YARRER and rule AA.99.AA). RR cannot be replaced by any number, for this rule the part is discarded and combiner 2 was not able to generate content from YARRER that has the same format as AA.99.AA)

Case 3: part has different length to the rule, part is discarded and cannot generate content.

Figure 4:
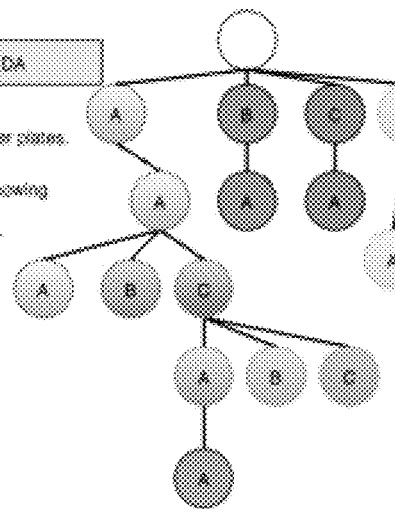
FIG. 4 is a schematic illustration of a digital trie data structure configured to store unavailable character strings associated with vehicle number plates.

FIG. 4 illustrates one embodiment of a digital trie data structure suitable for storing unavailable character strings or vehicle number plates already taken. The following tasks apply to the trie data structure:

1. Task 1 which involves creation or construction of a digital trie data structure storing unavailable number plates;
2. Task 2 adding a script to the system for receiving, checking and testing generated character strings or vehicle number plates;
3. Task 3 adding a timer or listener to the system for periodically, say every 24 hours, reading the data feed for updating of the unavailable character strings in the trie data structure.

Task 1 shows construction of the trie data structure as vehicle number plates become unavailable.

Figure 5:
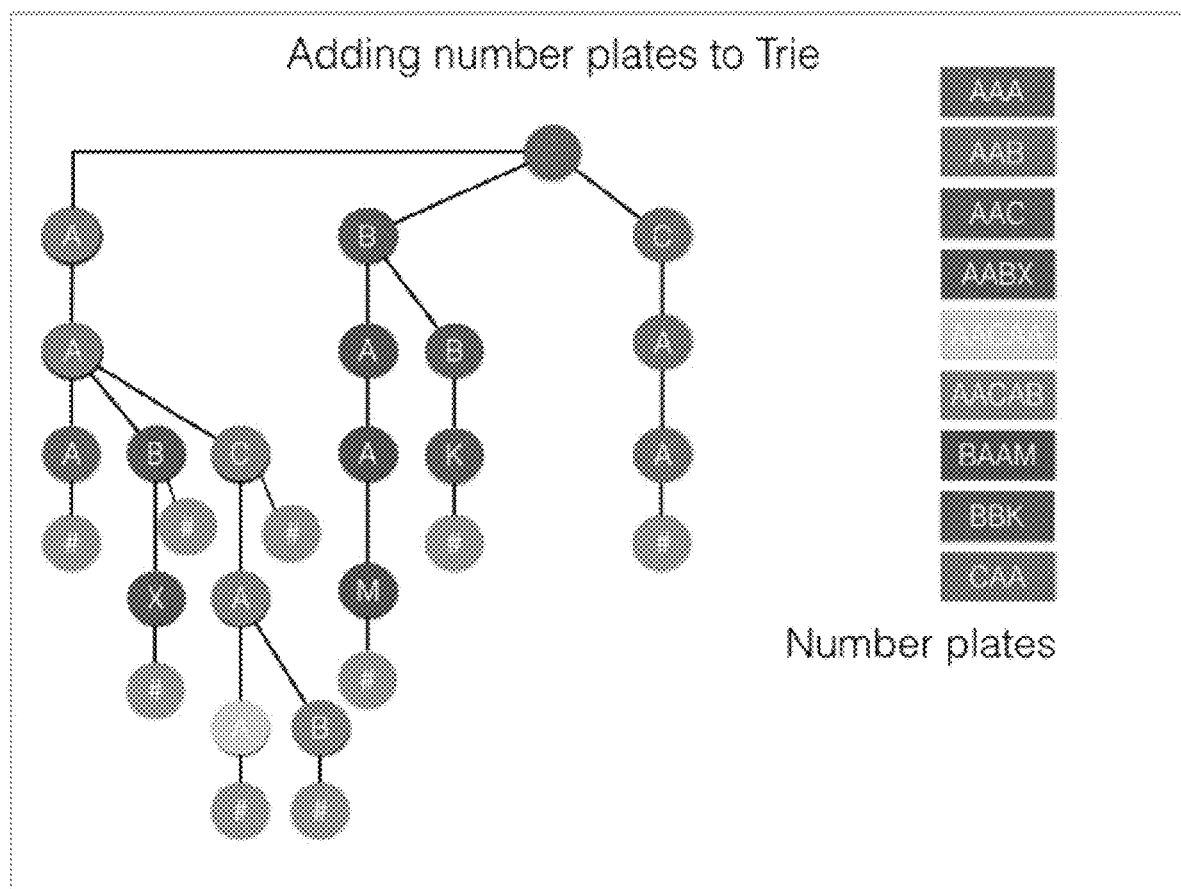
FIG. 5 is an exemplary digital trie data structure in construction for unavailable character strings associated with vehicle number plates.
Figure 6:
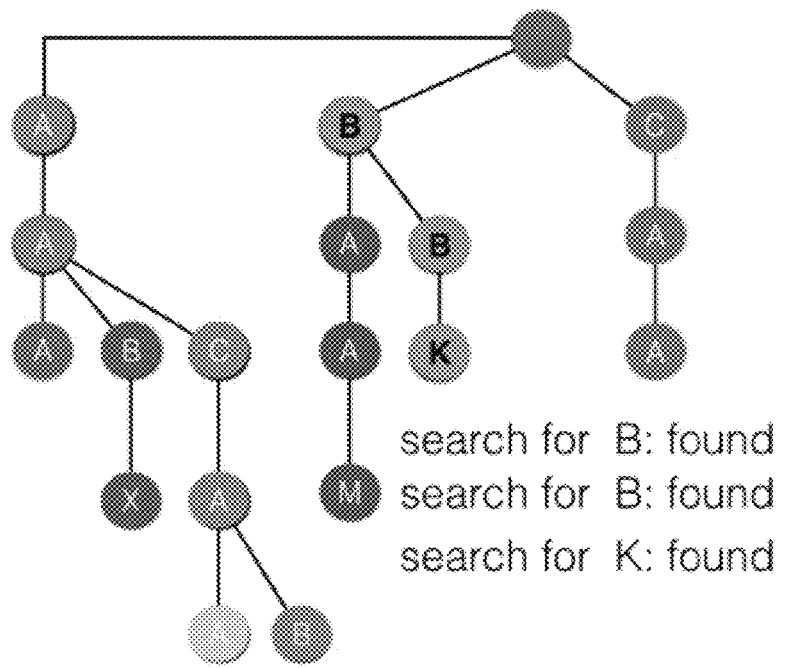
FIG. 6 is an exemplary digital trie data structure showing comparison of a sample generated character string with the unavailable character strings associated with the vehicle number plates of the trie data structure of FIG. 5.

FIGS. 5 and 6 illustrate another embodiment of a digital trie data structure including unavailable vehicle number plates and comparing a generated character string for its availability. In this example the generated character string BBK is found in the trie data structure and thus is not available. This means the generated character string BBK will be eliminated or filtered from the available combinations to be partitioned, in this example P plates and P+ or custom plates.

In this embodiment, the digital trie data structure consists of two sets:
Node
Trie
Node: is a trie element and are used as leaves of the trie data structure where each node contains:
    A character either an alphabet or an integer/number;
    A Boolean value stating if this node is a leaf;
    A linked list of nodes related to this specific node.
Trie: is the combination of all the nodes and contains:
Root node, which is an empty node;
Function search( ); which returns if a number plate is saved in a trie or contains a look-alike saved in the trie where the look-alike is a special case where available content cannot be used because something similar was already used, for example AAA111 is taken then AAAIII cannot be used, and wherein the trie also holds the functionality to check for similar content if it is already taken returning a true value meaning it cannot be used;
Function add( ): which adds a new number plate to the trie and this is used when setting up the trie and reading the large document file.
Function delete( ): which deletes a number plate from the trie.

The maximum size a child node can have is the number of characters in the language in addition to numbers from zero to ten. Those nodes are typically sorted alphabetically.

In this example, due to the use of only one request from each user, servlets are used in the system. A servlet is an applet that runs in a server, typically within java. It receives input from the user, processes it and then sends a response back.

Figure 7:
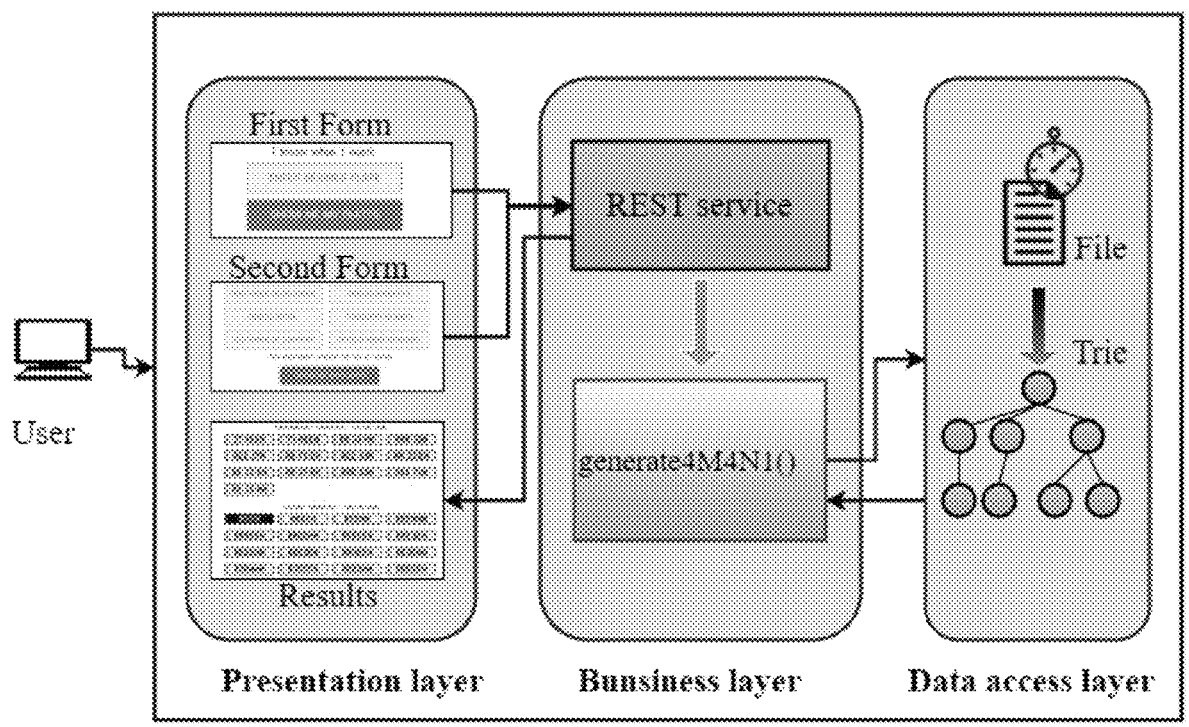
FIG. 7 schematically illustrates one embodiment of a computer system such as that implemented in the methodology of the disclosed embodiment.

FIG. 7 illustrates the system architecture according to one embodiment of the disclosure. In this implementation the computer-implemented method is provided via a website holding a domain name. The web application lies under a three-tier architecture deployed in a client-server environment in which presentation, application processing, and data management functions are physically separated. The functional process logic, data access, computer data storage and user interface are developed and maintained as independent modules on separate platforms. This architecture has three basic layers which are: presentation, business logic, and data layer. The first layer cannot interact directly with the third layer and vice versa. The web application is deployed over the three layers.

The presentation layer is the top level and contains the user interface (UI). This tier accepts input from the user and enables the viewing of information and results at the front end. Its main function is to transfer the tasks and outcome to something the user can understand. The presentation layer may also hold a lightweight validation. The presentation layer holds three more pages related to the user interface. Two of the pages present or display the results for each of the earlier two forms. FIG. 8B shows the design of the results pages. When the user selects a combination, it presents the content selected to the main website for design and payment. The interaction between the presentation layer and the next layers is done through a set of https requests and responses.

The business layer implements the preferred combined algorithm configured to generate the possible character strings for number plates. The main objective of the preferred algorithm is to generate combinations based on the user "alphabetical" details such as first name, last name and nick name in addition to other "numerical" details as date of birth and favourite number. Usually, those phrases encompass a large number of alphabets and numbers. Therefore, the way these details are ordered and combined may affect the meaning of "personalized".

The Data Access Layer is a tier that contains the data access logic needed for the application. The basic operation to use at this stage is fetching data. Based on the system specifications, UPDATE, CREATE, DELETE are not used in all the parts. Reading data is used to check every generated combination if it can be used or not. In this example the generated character string or personalized plate number is compared with the unavailable plate numbers in the trie data structure of the system memory. This determines whether or not the generated combination can be used.

In using the system, the user typically seeks a combination that holds some of the characteristics that are considered personalized. The system is configured to generate personalized combinations for every user. It is understood from surveys that users generally want to have a combination that is a mix of their details such as: first name, middle name, last name, nickname, partner initials, date of birth and favourite number. The system is configured to deal with two types of users. The first type is a user who already checked a plate and unavailable. The second type is a new user who wants to find a combination that describes his details. A graphical user interface GUI that contains the two forms described earlier been created to enable the interaction between the user and the system.

Figure 8A:
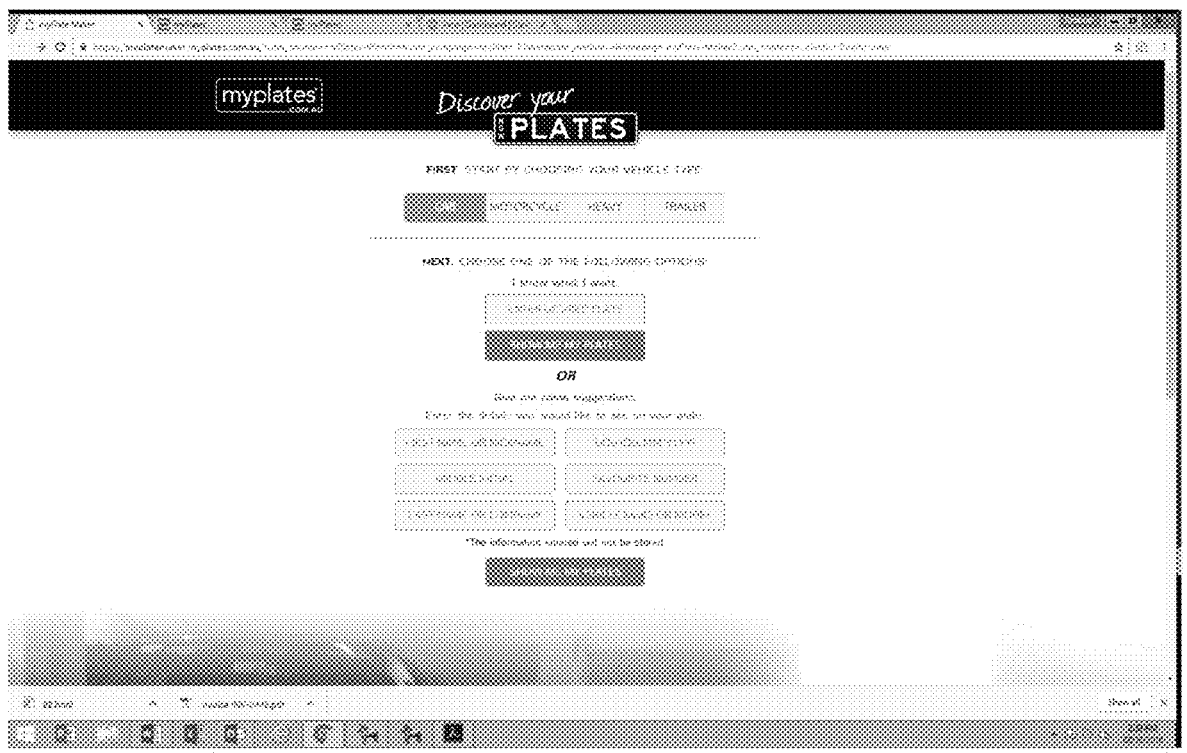
Figure 8B:
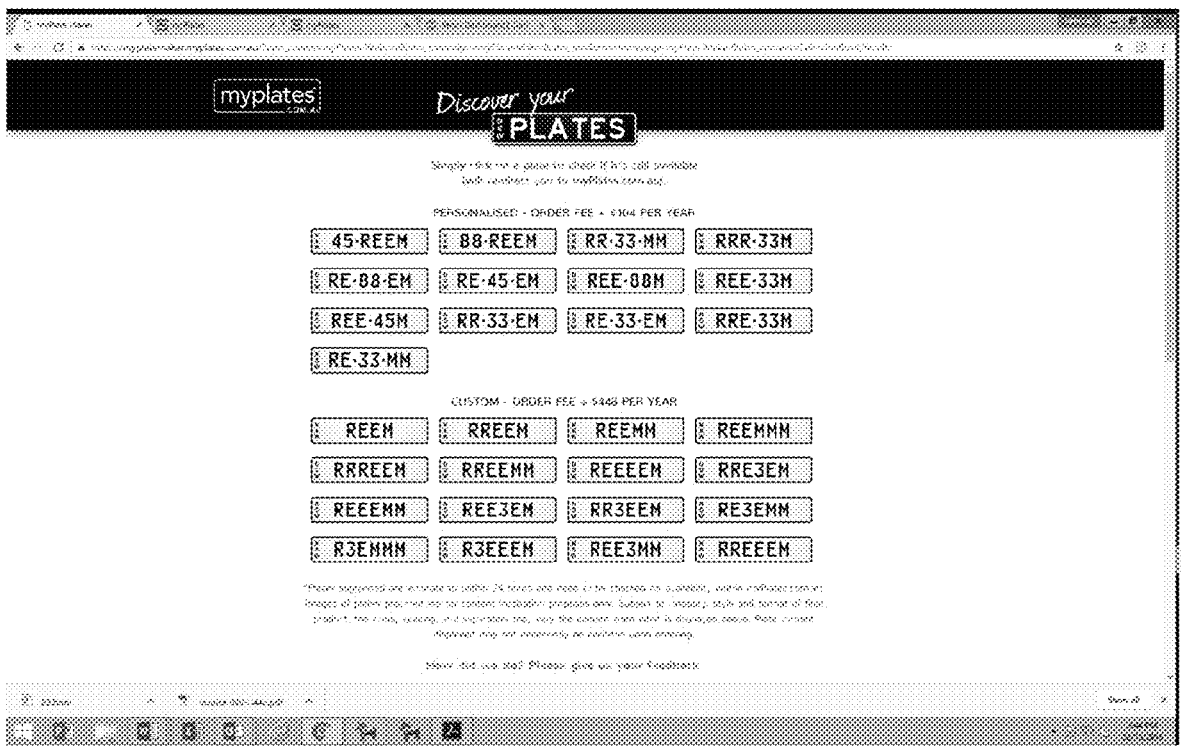
Figure 8C:
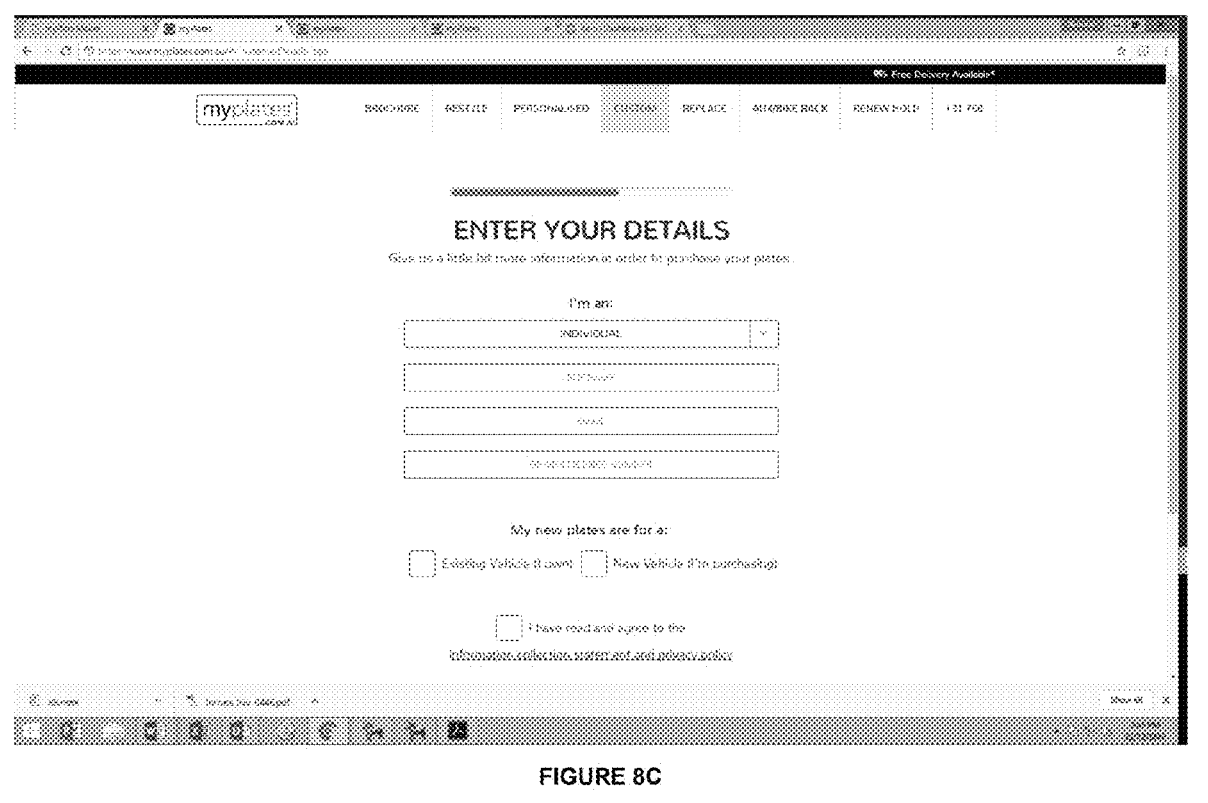

FIGS. 8A to 8C show screenshots of different GUIs with a user interacting with the system. The homepage of FIG. 8A was in this example developed using HTMLS, CSS, JS and Angular JS JQuery. Two forms on the same page were created including a first form that may contain user details. The system was configured to operate in any of the following cases:

Where any of the forms contains content;
Parts of the entries filled including at least one of the following: First Name, Last Name, Nickname, previous combination;
Full form where each entry is assigned a value.

For other cases, such as just numbers, the system may not produce results. If the "submit" button is clicked before entering data into the form, a package of frequently used words may be used as inputs, and contents are generated based on those words. The more data added to this form the more combinations are generated. Using JQuery, a lightweight validation function may be implemented. This function is responsible for validating the user input before sending it to the next layer for processing. Using numbers in names text boxes may not be allowed and may generate a red notification alerting users that this action is not permitted. Same case may occur when adding letters into text boxes that accepts only numbers. Furthermore, some words are considered offensive and not accepted in vehicle's groupings. The form data will not traverse into the next layer if one of these offensive words appear in any of the text boxes.

In a second form, a text box and a submit button has been created on the homepage. The user is enabled to add a previous combination that he/she might have tried and wants to see alternatives. This form was created to satisfy users who want combinations related to content seen before. It was developed the same way as the first form. Also, it holds the same lightweight validation regarding unavailable words, but it enables a mix of alphabets and numbers to be added. If the data added to this form is available to be taken, the system will proceed to final design and payment.

Now that these embodiments of the disclosure has been described, it will be understood that the computer system and computer-implemented method configured to issue a personalized vehicle number plate have at least the following advantages:

1. they present a relatively large number of options for selection as personalized vehicle number plates thus increasing the likelihood a user will select and purchase one of the presented options;
2. they lend themselves to the generation of character strings for selection as personalized number plates without being limited to one particular format;
3. they provide the user with multiple options of available number plates without compromising the degree to which the number plates offered are considered "personalized";
4. the system is relatively quick in presenting multiple options without undue delay which might otherwise discourage its use;
5. they are configured to present unique options to the user without duplication of character strings which may otherwise confuse the user.

Those skilled in the art will appreciate that the disclosure described herein is susceptible to variations and modifications other than those specifically described. The specific algorithm from which the first and second character strings are generated may vary from the described embodiments provided both a rules-based algorithm and hybrid-type algorithm are applied to the entered user data. The comparison module may vary from the digital tree structure described although the system has enhanced speed in that form of its implementation. It will be understood that the system has universal application without limitation in terms of the format of the vehicle number plates. All such variations and modifications are to be considered within the scope of the present disclosure the nature of which is to be determined from the foregoing description.

The invention is claimed as follows:

1. A personalized vehicle number plate generation computer system comprising:
a processor;
a memory device that stores a plurality of instructions that, when executed by the processor, cause the processor to:
receive individual identifying content;
generate a first plurality of character strings of a predetermined number of characters, wherein the generation of the first character strings is derived from an application of a rules-based algorithm to the received individual identifying content by: (a) interposing one or more characters between the received individual identifying content, or (b) prefixing or suffixing one or more characters to the received individual identifying content;

separate from the generation of the first character strings derived from the application of the rules-based algorithm to the received individual identifying content, generate a second plurality of character strings of a range of predetermined numbers of characters, wherein:

the generation of the second character strings is derived from an application of a hybrid-type algorithm to the same received individual identifying content that the rules-based algorithm was applied to by: (i) replicating at least one of the characters of the received individual identifying content to produce a first generation set of character strings, (ii) for each member of the first generation set, replicating at least one of the characters to produce a second generation set of character strings, and (iii) repeating (ii) for each member of the second generation set until a predetermined maximum number of characters is obtained in the generated set of character strings, and the hybrid-type algorithm is different from the rules-based algorithm;

compare the first and second generated character strings with unavailable character strings associated with unavailable vehicle number plates;

cause a presentation of available character strings, said presentation being based on the comparison of the first and second generated character strings with the unavailable character strings associated with the unavailable vehicle number plates; and receive a selection of at least one of the presented available character strings in association with an unissued personalized vehicle number plate.

2. The personalized vehicle number plate generation computer system of claim 1, wherein when executed by the processor, the plurality of instructions cause the processor to cause the memory device to periodically store the unavailable character strings associated with the unavailable vehicle number plates locally in a digital trie data structure for comparison with the generated character strings.

3. The personalized vehicle number plate generation computer system of claim 2, wherein when executed by the processor, the plurality of instructions cause the processor to periodically import, from a remote database, a substantially real-time record of the unavailable character strings associated with the unavailable vehicle number plates.

4. The personalized vehicle number plate generation computer system of claim 3, wherein when executed by the processor, the plurality of instructions cause the processor to compare the selected at least one of the presented available character strings with the unavailable character strings associated with the unavailable vehicle number plates imported from the remote database to confirm availability of the selected at least one of the available character strings.

5. The personalized vehicle number plate generation computer system of claim 1, wherein when executed by the processor, the plurality of instructions cause the processor to combine the first and subsequent sets of the character strings to provide the second plurality of character strings of the range of predetermined numbers of characters.

6. A method of operating a personalized vehicle number plate computer system, said method comprising:

receiving individual identifying content;

generating, by a processor, a first plurality of character strings of a predetermined number of characters, wherein the generation of the character strings is derived from an application of a rules-based algorithm to the received individual identifying content, and generating, by the processor, the first plurality of character strings of the predetermined number of characters comprises: (a) interposing one or more characters between the received individual identifying content, or (b) prefixing or suffixing one or more characters to the received individual identifying content;

separate from the generation of the first character strings derived from the application of the rules-based algorithm to the received individual identifying content, generating, by the processor, a second plurality of character strings of a range of predetermined numbers of characters, wherein:

the generation of the second character strings is derived from an application of a hybrid-type algorithm to the same received individual identifying content that the rules-based algorithm was applied to, the hybrid-type algorithm is different from the rules-based algorithm, and generating, by the processor, the second plurality of character strings comprises:

(i) replicating at least one of the characters of the received individual identifying content to produce a first generation set of character strings, (ii) for each member of the first generation set, replicating at least one of the characters to produce a second generation set of character strings, and (iii) repeating (ii) for each member of the second generation set until a predetermined maximum number of characters is obtained in the generated set of character strings;

comparing, by the processor, the first and second generated character strings with unavailable character strings associated with unavailable vehicle number plates;

causing a presentation of available character strings, said presentation being based on the comparison of the first and second generated character strings with the unavailable character strings associated with the unavailable vehicle number plates; and receiving a selection of at least one of the presented available character strings in association with an unissued personalized vehicle number plate.

7. The method of claim 6, further comprising periodically storing, by a memory device, the unavailable character strings associated with the unavailable vehicle number plates locally in a digital trie data structure for comparison with the generated character strings.

8. The method of claim 7, further comprising periodically importing the unavailable character strings from a remote database including a substantially real-time record of the unavailable character strings associated with the unavailable vehicle number plates.

9. The method of claim 8, further comprising comparing, by the processor, the selected at least one of the presented available character strings with the unavailable character strings associated with the unavailable vehicle number plates from the remote database to confirm availability of the selected at least one of the available character strings.

10. The method of claim 6, wherein generating, by the processor, the second plurality of character strings further comprises combining the first and subsequent sets of the character strings to provide the second plurality of character strings of the range of predetermined numbers of characters.

11. The method of claim 6, further comprising combining, by the processor, the first and second generated character strings to provide a combined set of generated character strings prior to comparison with the unavailable character strings associated with the unavailable vehicle number plates.

12. The method of claim 11, further comprising partitioning, by the processor, the combined set of character strings prior to presenting the available character strings, said partitioning involving separating of the combined set of character strings into subsets of character strings of respective of the range of predetermined numbers of characters.

13. A non-transitory computer readable medium that stores a plurality of instructions that, when executed by a processor, cause the processor to:
receive individual identifying content;
generate a first plurality of character strings of a predetermined number of characters, wherein the generation of the first character strings is derived from an application of a rules-based algorithm to the received individual identifying content by: (a) interposing one or more characters between the received individual identifying content, or (b) prefixing or suffixing one or more characters to the received individual identifying content;
separate from the generation of the first character strings derived from the application of the rules-based algorithm to the received individual identifying content, generate a second plurality of character strings of a range of predetermined numbers of characters, wherein:
the generation of the second character strings is derived from an application of a hybrid-type algorithm to the same received individual identifying content that the rules-based algorithm was applied to by: (i) replicating at least one of the characters of the received individual identifying content to produce a first generation set of character strings, (ii) for each member of the first generation set, replicating at least one of the characters to produce a second generation set of character strings, and (iii) repeating (ii) for each member of the second generation set until a predetermined maximum number of characters is obtained in the generated set of character strings, and
the hybrid-type algorithm is different from the rules-based algorithm;
compare the first and second generated character strings with unavailable character strings associated with unavailable vehicle number plates;
cause a presentation of available character strings, said presentation being based on the comparison of the first and second generated character strings with the unavailable character strings associated with the unavailable vehicle number plates; and
receive a selection of at least one of the presented available character strings in association with an unissued personalized vehicle number plate.

14. The non-transitory computer readable medium of claim 13, wherein when executed by the processor, the plurality of instructions cause the processor to cause the memory device to periodically store the unavailable character associated with the unavailable vehicle number plates strings locally in a digital trie data structure for comparison with the generated character strings.

15. The non-transitory computer readable medium of claim 14, wherein when executed by the processor, the plurality of instructions cause the processor to periodically import, from a remote database, a substantially real-time record of the unavailable character strings associated with the unavailable vehicle number plates.

16. The non-transitory computer readable medium of claim 15, wherein when executed by the processor, the plurality of instructions cause the processor to compare the selected at least one of the presented available character strings with the unavailable character strings associated with the unavailable vehicle number plates imported from the remote database to confirm availability of the selected at least one of the available character strings.

17. The non-transitory computer readable medium of claim 13, wherein when executed by the processor, the plurality of instructions cause the processor to combine the first and subsequent sets of the character strings to provide the second plurality of character strings of the range of predetermined numbers of characters.

18. A device comprising:
an input device;
a display device;
a processor;
a memory device that stores a plurality of instructions that, when executed by the processor, cause the processor to:
receive, via the input device, individual identifying content;
communicate the received individual identifying content to a server that generates, via an application of a rules-based algorithm to the received individual identifying content, a first plurality of character strings of a predetermined number of characters by (a) interposing one or more characters between the received individual identifying content, or (b) prefixing or suffixing one or more characters to the received individual identifying content, separate from the generation of the first character strings derived from the application of the rules-based algorithm to the received individual identifying content, generates, via an application of a hybrid-type algorithm to the same received individual identifying content that the rules-based algorithm was applied to, a second plurality of character strings of a range of predetermined numbers of characters by (i) replicating at least one of the characters of the received individual identifying content to produce a first generation set of character strings, (ii) for each member of the first generation set, replicating at least one of the characters to produce a second generation set of character strings, and (iii) repeating (ii) for each member of the second generation set until a predetermined maximum number of characters is obtained in the generated set of character strings, and compares the first and second generated character strings with unavailable character strings associated with unavailable vehicle number plates, wherein the hybrid-type algorithm is different from the rules-based algorithm;
receive, from the server and based on the comparison of the first and second generated character strings with the unavailable character strings associated with the unavailable vehicle number plates, available character strings;
cause the display device to display the available character strings; and
receive, via the input device, a selection of at least one of the displayed available character strings in association with an unissued personalized vehicle number plate.

* * * * *

UNITED STATES PATENT AND TRADEMARK OFFICE
CERTIFICATE OF CORRECTION

PATENT NO. : 10,909,330 B2
APPLICATION NO. : 15/793487
DATED : February 2, 2021
INVENTOR(S) : Ali Haidar Page 1 of 1

It is certified that error appears in the above-identified patent and that said Letters Patent is hereby corrected as shown below:

On the Title Page

Item (71) Applicant replace "St. Lenonards" with --St. Leonards--
Item (72) Inventor replace "St. Lenonards" with --St. Leonards--
Item (73) Assignee replace "St. Lenonards" with --St. Leonards--

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*